Figure 1:
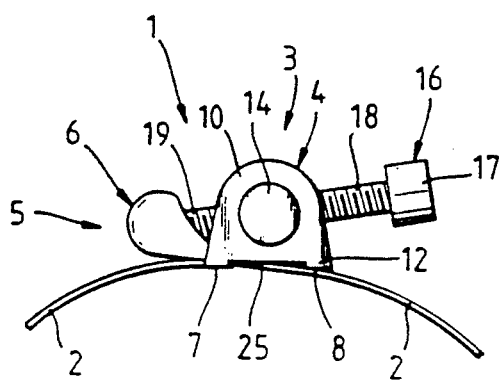

United States Patent [19]

Baekdahl

[11] Patent Number: 5,323,515
[45] Date of Patent: Jun. 28, 1994

[54] HOSE CLAMP

[75] Inventor: Samuel Baekdahl, Vildbjerg, Denmark

[73] Assignee: Exportservice AS, Norway

[21] Appl. No.: 969,239

[22] PCT Filed: Aug. 19, 1991

[86] PCT No.: PCT/NO91/00112
§ 371 Date: Feb. 19, 1993
§ 102(e) Date: Feb. 19, 1993

[87] PCT Pub. No.: WO92/03682
PCT Pub. Date: Mar. 5, 1992

[30] Foreign Application Priority Data

Aug. 20, 1990 [DK] Denmark .............. 1981/90

[51] Int. Cl.⁵ .............................................. A44B 11/00
[52] U.S. Cl. .............................................. 24/279; 24/280
[58] Field of Search ............ 24/279, 280, 281, 282, 24/271; 285/253; 248/74.3

[56] References Cited

U.S. PATENT DOCUMENTS

| 912,097 | 2/1909 | Erickson | 24/279 |
|---|---|---|---|
| 1,070,952 | 8/1913 | Erickson | 24/279 |
| 1,252,323 | 1/1918 | Cooper | |
| 1,272,541 | 7/1918 | Scott | 24/279 |
| 1,479,679 | 1/1924 | Sandholm | |
| 1,678,915 | 7/1928 | Riddle | |
| 1,782,476 | 1/1930 | Parker | |
| 3,407,448 | 10/1968 | Tetzlaff et al. | 285/253 |

FOREIGN PATENT DOCUMENTS

| 0021256 | 1/1981 | European Pat. Off. | 24/279 |
|---|---|---|---|
| 313221 | 8/1969 | Sweden | |
| 430142 | 6/1935 | United Kingdom | |
| 550692 | 1/1943 | United Kingdom | |
| 895549 | 5/1962 | United Kingdom | |

Primary Examiner—Victor N. Sakran
Attorney, Agent, or Firm—Volpe and Koenig

[57] ABSTRACT

A clamp for tightening a strip of arbitrary length around an object. The clamp includes tightening mechanisms which attach to the ends of the strip. The mechanisms are adapted so that the inner surface of a cup-shaped element of one mechanism receives the free threaded end of a tightening bolt which is pivotably mounted in a rotatable cross-peg extending through ears of the other tightening mechanism. One end of the strip is selectively securable to the clamping mechanism by a locking device having an aperture and bendable ears. The strip is locked by being passed through the aperture, folded back on itself, folded forward on itself, held by bendable ears crimped over the folded strip, and again folded back on itself and held by a second set of bendable ears crimped over the folded strip. The clamp is particularly useful for tightening a hose around an object without forming a bulge in the hose thereby preventing local leakage.

7 Claims, 3 Drawing Sheets

HOSE CLAMP

The present invention concerns a clamping device for tightening a clamping strip, comprising two working mechanism parts whereof each has an operating end meshing with the other part's operating end, and whereof each has an inner surface abutting against the material about which the mechanism is to be clamped with the mechanism, whereof the first mechanism part in its meshing end section has an inner thread wherein a tightening screw is secured in a lengthwise extendable or retractable manner, and the second mechanism part in its meshing section has an operating part meshing with the tightening screw in such a way that the clamping strip is tightened and loosened when the tightening screw is screwed in through, respectively out through, the inner thread.

It is known a clamping strip equipped with a tightening mechanism of the mentioned type, wherein two mechanism parts at their meshing ends are equipped with a cross-piece extending from the inner section of each mechanism part, and whereof both are equipped with a centre hole through which a common tightening screw is passed and being equipped with a counter-nut at its free threaded part When the screw is screwed into the counter-nut, this will, in engaging action against the one cross-piece, displace this in the direction towards the second cross-piece against which the head of the tightening screw is engaged. Thus the clamping strip is tightened around the material around which it is wanted to clamp the clamping device equipped with the tightening mechanism. A significant disadvantage with this arrangement is that the part of the material being present between the cross-pieces of the mechanism parts vis-a-vis the handle of the tightening screw during the tightening operation, has a tendency to form a local bulge which partly prevents the cross-pieces to be tightened further together and partly causes a local leakage under the bulge, if the material is a hose to be secured about a connecting piece.

It has been attempted to alleviate this drawback by placing between the cross-pieces at their bottom parts a protecting plate secured to one of the cross-pieces to prevent the mentioned bulging. It has, however, been found that such a protecting plate can not prevent the mentioned bulging of the material since the protecting plate itself participates in the bulging if it is produced in the same material thickness and material type as the two mechanism parts.

It is the purpose of the invention to produce a clamping mechanism of the above mentioned kind wherein risk for lokal bulging of the material, around which the clamping strip is to be tightened, is avoided in a simple fashion.

This is achieved with a clamping mechanism being characterized in that the said meshing part on the second mechanism part is formed as a cup with a outer bottom being present in and constituting the end of a strip-shaped part, wherein the first mechanism part close to the inner threads has an opening through which the second strip-shaped section of the mechanism part runs so that the two mechanism parts cross each other via this opening, and that the free threaded end of the tightening screw abuts against the inner surface of the cup when the clamping strip is tightened by rotating the tightening screw through the inner threads. Thus it is completely avoided a lokal bulging at the tightening mechanism of the material about which the clamping strip is to be tightened, and as a consequence thereof it becomes possible to transfer, via the clamping mechanism, far greater tightening forces to the clamping strip than what has previously been possible with similar known clamping mechanisms. As a result of the fact that the meshing part is formed as a cup in the end of the strip-formed part, it is achieved partly that the free threaded end of the screw is kept in place in the interior of the cup, and partly that the shape of the cup gives the end of the strip-shaped part a great stiffness of form so that even greater pressure forces from the free end of the screw may be assimilated in the cup and transferred to the strip-shaped part and further to the clamping strip. That local bulging is prevented is naturally caused by the two mechanism parts crossing each other in the clamping mechanism.

If it is required that the clamping mechanism is used for both clamping strips of certain lengths between the clamping mechanism and of variable lenghts between the clamping mechanisms, it may be chosen an universal embodiment wherein the inner threads advantageously is provided through a cross peg, the ends of said peg being pivotably contained in corresponding openings in each of two ears extending to the same side and being present vis-a-vis each other in the first mechanism part, and where the two ears at their bottom sections have a mutual distance from each other being 100–120%, preferably 105%, larger than the width of the strip-shaped part, as well as two crossing connecting parts whereof one (12) is situated in the outermost end of the meshing end (4) of the first mechanism part (12) at a distance from the second connecting part (11) of 90–150%, preferably 100%, of the width of the strip-shaped part (22), and wherein the second connecting part (11) of the cross-peg (14) lies at a distance greater than the thickness of the strip-shaped part in the second mechanism part. As a result of the pivotable securing of the cross peg, the tightening screw situated on the inner threads may be inclined according to the path which the previously mentioned cup follows during the tightening operation of the clamping mechanism, said path being determined by the diameter of the material about which the clamping strip equipped with the tightening mechanism is to be secured. In case the disclosed clamping mechanism is to be used for objects with a relatively small diameter, the two mechanism parts may conveniently be present at each end of a clamping strip.

A more universally usable clamping mechanism is provided by the two mechanism parts each being equipped in their meshing ends with a penetration aperture for the clamping strip ends adjusted according to the width of the clamping strip. Thus any length of a clamping strip may be attached by the clamping mechanism by their respective ends being passed through each of their penetration aperture and being bent backwards at the inner parts of the mechanism parts so that the mechanism's bent ends during the tightening of the clamping strip about an object, are placed against the object's outer surfaces and are thus prevented from being drawn out through the penetration apertures during the tightening operation of the clamping mechanism.

In some cases there are difficulties in determining in advance the length of the clamping strip before mounting it in the clamping mechanism, and in such caseses it is convenient that one mechanism part at the opposite end from its meshing end is equipped with a locking device for a clamping strip being bent outwards and backwards, i.e. for the end of a clamping strip having been passed through at least one penetrating aperture and having been bent backwards to the opposite side of the inner surface of the mechanism part, i.e. to its outer side. Thus it is accomplished that the clamping mechanism, with the tightening screw in its most extended state and with the one clamping strip end bent backwards and placed in the penetrating aperture in the first mechanism part, may be arranged around the object about which the clamping strip is to be placed, whereupon the second end of the clamping strip may be passed through the penetrating aperture in the second mechanism part during a simultaneous tightening of the clamping strip by pulling on the clamping strip extending through the penetrating aperture, whereupon this end is bent backwards on the outer surface of the mechanism part with subsequent locking of the locking device. Then the tightening mechanism is activated and the locking device prevents the outer backwards bent clamping strip to be pulled through its penetrating aperture during the tightening operation.

In a simple embodiment for the locking device it comprises conveniently at least a couple of bent ears to be folded downwards across the backwards bent section of the clamping strip at both its side edges after the clamping strip has been passed through the penetrating aperture and folded backwards at the outer surface of the mechanism part. These locking bent ears may be folded in place against the outer surface of the clamping strip by using a hammer or another tool. In cases where exceptionally large pulling forces are required to be transferred from the clamping device to the clamping strip, the locking device comprises preferably at least a couple of additional bent ears to become folded across a further folded stretch of the clamping strip at both its side edges after the backwards bent section has become secured by the first pair or pairs of bent ears. Thus it has been found possible to completely eliminate the tendency of the clamping strip at large forces applied to the clamping strip to slide through its penetrating aperture in the end where the backbending has been performed on the outside of the clamping strip, and this is probably due to the fact that the locking force of the latest mentioned bent ears assists in increasing the locking force of the first mentioned locking ears via the clamping strip which thereby in a completely flat zig-zag-form is being secured by the two sets of locking folded ears.

Figure 2:
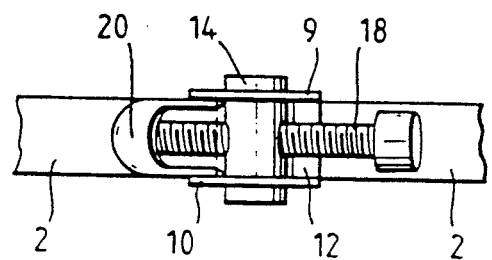
Figure 3:
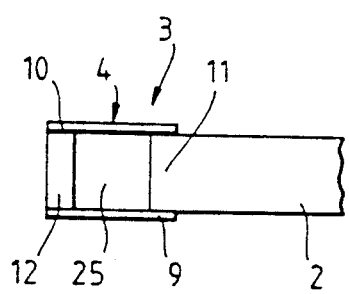
Figure 4:
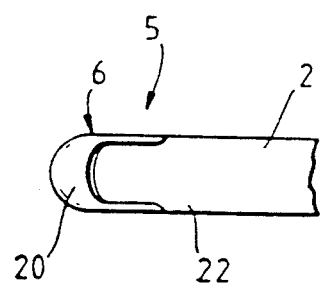
Figure 5:
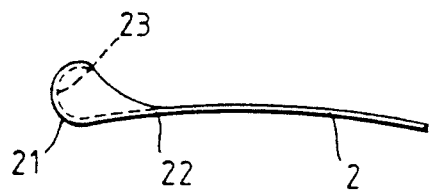
Figure 6:
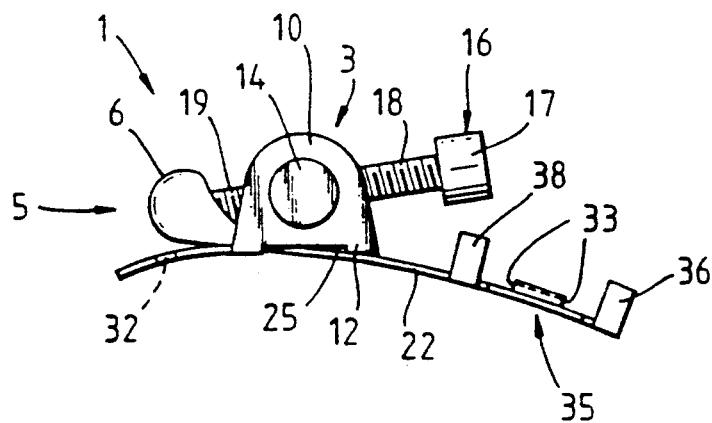
Figure 7:
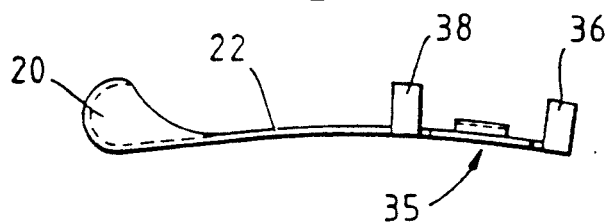
Figure 8:
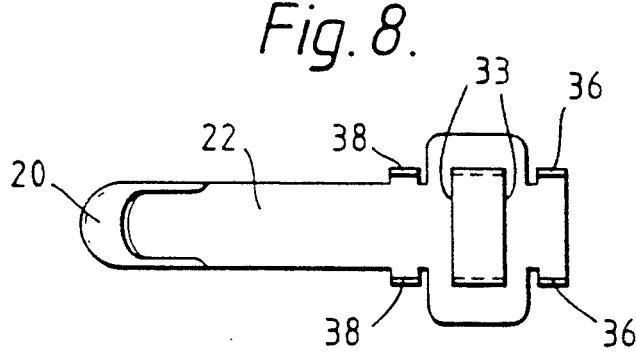
Figure 9:
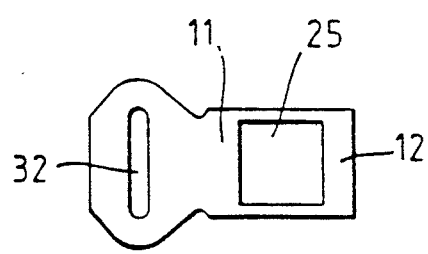
Figure 10:
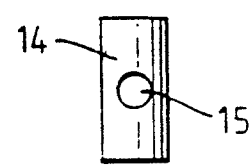
Figure 11:
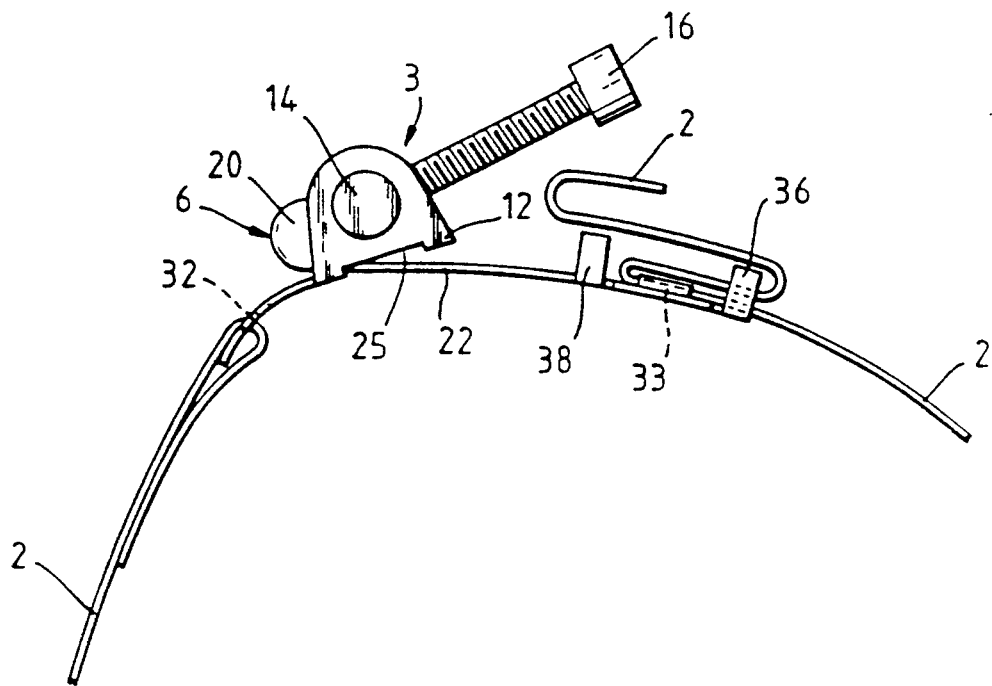
Figure 12:
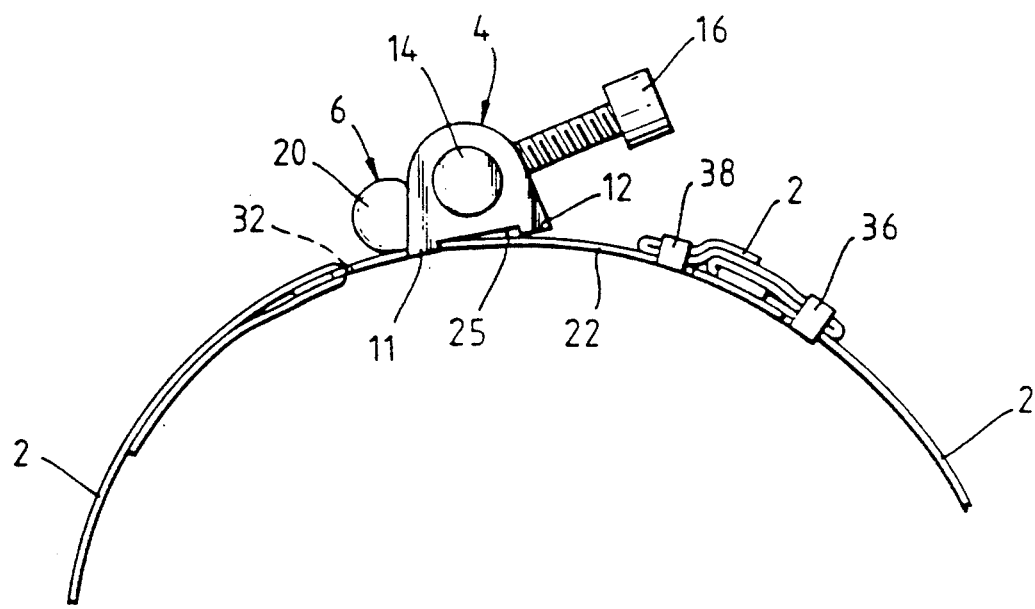

The invention is in the following to be more closely explained in connection with a couple of embodiments and with reference to the figures wherein:

FIG. 1 shows a tightening mechanism integrated with a clamping strip in an assembled condition and view from the side, FIG. 2 equals FIG. 1, but viewed from above, FIG. 3 shows the meshing end of a first mechanism part, FIG. 4 shows the cup-formed meshing section of a second mechanism part, FIG. 5 shows a side-view of the cup-formed meshing end from FIG. 4, FIG. 6 shows a tightening mechanism to which a clamping strip of a random length may be secured to the first mechanism part and the second mechanism part, respectively, FIG. 7 shows a side-view of the cup-formed meshing end of the second mechanism part, FIG. 8 shows the meshing end from FIG. 7, but viewed from above, FIG. 9 shows the first meshing end of the first mechanism part from FIG. 6, viewed from below, FIG. 10 shows a threaded cross-peg, FIG. 11 shows the tightening mechanism from FIG. 6 connected to the two ends of a clamping strip before securing of the locking device, and FIG. 12 equals FIG. 11 after the locking device has become secured with the tightening mechanism ready for clamping with a great clamping force.

FIGS. 1-5 show a tightening mechanism 1 which is integrally formed with a clamping strip 2 so that a first mechanism part 3 with its meshing end 4 is integrally formed with the first en of the clamping strip 2, while a second mechanism part 5 is located with its meshing part 6 in the clamping strip's 2 other end. The meshing end 4 and the meshing end 6 have inner surfaces 7,8 together with the inner surface of the clamping strip 2 which engage a not shown object about which the clamping strip equipped with the clamping mechanism is to be clamped. The meshing end 4 comprises in the shown embodiment two parallell ears 9,10 being situated across from each other, and where their bottom parts are mutually connected via connecting parts 11,12 where the connecting part 12 simultaneously comprises the meshing end's 4, and thus the first mechanism part's 3, extreme end. A cross peg 14 is at its ends pivotably engaged in corresponding openings in each of the two ears 9,10, and the cross peg 14 is eqipped with a crossing inner thread 15, see FIG. 10, through which a tightening bolt is screwed. The tightening bolt 16 has a head 17, to tighten with e.g. a hexagonal wrench, a body 18 passing through the threads 15, and which with its free threaded end 19 engages the meshing end 6. The meshing end 6 comprises a meshing part 20 being formed as a cup with an outer bottom surface 21 lying in and comprising the end of a strip-shaped part 22, which in this embodiment comprises the one end of the clamping strip 2. The inner bottom surface 23 of the cup 20 engages the free threaded end 19 of the tightening bolt 16 when the clamping strip 2 is tightened by advancing the tightening bolt 16 through the inner thread 15. The two mechanism parts 3 and 5 of the tightening mechanism 1 cross each other via a slot 25 being present in the meshing part 4 between the bottom parts of the two ears 9,10 and the connecting parts 11,12 of the ears.

FIGS. 6-9 show another embodiment of the clamping mechanism 1, wherein a randomly long clamping strip may be mounted, the two mechanism parts 3,5 at their opposit ends 30 respectively 31 of their meshing ends 4,6 having each a penetrating aperture 32 respectively 33 for one of the ends of the clamping strip adjusted according to the width of the clamping strip. The one mechanism part 3 or 5, here the mechanism part 5, is at the opposit end 31 of its meshing part 6 formed with a locking device 35 to an outer backwards folded clamping strip end, i.e. for a clamping strip end being first passed through at least one penetrating aperture and being folded backwards to the opposit side of the mechanism part's, here 5, inner surface, here 8, i.e. to its outer surface. This is apparent from FIG. 11. The here shown embodiment for the locking device 35 comprises at least one pair of bent ears 36 for becoming bent inwards and across the backwards folded section of the clamping strip at both its side edges after the clamping strip has been passed through the penetrating aperture 33 and been folded backwards at the outer surface of the mechanism part 5. The locking device 35 comprises at least a couple of additional bending ears 38 to be, after the backwards bent section of the clamping strip has been secured by the first pair of bent ears 36, bent across over a further forwards bent clamping strip section at both its side edges. This is illustrated in FIG. 12 wherein both pairs of the bent ears 36,38 have been bent into place about the outer first backwards folded and then forwards folded sections of the clamping strip. The clamping strip section which has been passed through the penetrating aperture 32 in the first mechanism part 3, may just be folded backwards at the inner surface of the strip, and where it is subsequently secured by the non-shown object when the clamping mechanism is tightened.

The securing embodiment shown in FIG. 11 and 12 for a randomly long clamping strip to the tightening mechanism according to the invention may also advantageously be used for other tightening mechanisms for clamping strip-s if only the tightening mechanisms are equipped with the mentioned penetrating apertures 32,33 and a pair of bent ears 36, preferably two pairs of bent ears 36,38.

As examples of materials for the first and second mechanism part and the cross peg it may be mentioned stainless steel, aluminum, galvanized iron, although the first mechanism part may be completely of partially hardened. As strip material there may be used all conventional clamping strip materials. Said materials may be both of an unperforated and perforated kind. As a further example of a locking device it may be mentioned an excenter-lock where a wing-activated excenter-roll is pivotably positioned across the strip-formed part 22 of the second mechanism part 5 adjacent to the penetrating aperture 33, thus making it possible for the clamping strip to be secured with an outer backwards folded section or with a folding pattern as shown in FIG. 11.

I claim:

1. Tightening mechanism for tightening a separate tightening strip (2) of an arbitrary length comprising two mechanism parts (3,5) each having a meshing end (4,6) to cooperate with the opposite part's meshing end (6,4) and each having an inner surface (7,8) to engage the object about which the clamping strip is to be secured with the mechanism (1), wherein the first mechanism part (3) at its meshing end (4) has an inner thread wherein a tightening screw (16) is situated in a lengthwise displaceable manner, and the second mechanism part (5) has at its meshing end (6) a meshing part for cooperating with the tightening screw (18) so that the tightening strip (2) is tightened and loosened with the tightening screw (16) is advanced or retracted via the inner thread and wherein the meshing part on the second mechanism part (5) is formed as a cup (20) where its outer bottom surface (21) is situated in and comprises the end of a strip-shaped part (22), and wherein the first mechanism part (3) close to the inner thread (15) has an aperture (25) through which the second mechanism's part strip-shaped part (22) passes so that the two mechanism parts (3,5) cross each other via this aperture (25) and that the free thread part (19) of the screw (16) engages the inner bottom surface (23) of the cup (20) when the tightening strip (2) is tightened by advancing the tightening screw (16) through the inner threads (15), the tightening strip (2) being passed through securing slots (32,33) in each of the parts of the tightening mechanism, characterized in that the inner threads (15) pass through a rotatable cross-peg (14), the ends of said peg (14) being pivotably held in corresponding openings in each of two ears (9,10) extending to the same side and being situated across from each other in the first mechanism part (3), and that the two ears (9,10) at their bottom parts have a mutual distance from each other being 100–120% larger than the width of the strip-shaped part (22) as well as two crossing connecting parts (11,12) wherein one is situated at the extreme end of the meshing end (4) of the first mechanism part (3) at a distance from the second connecting part (11) of 50–150% of the strip-shaped part's (22) width, and the second connecting part (11) harbouring the two upwards protruding ears (9,10) and the cross-peg (14) having an overall width larger than the width of the strip part (22), at least one of the tightening mechanism parts (3,5) further having a locking device (35) comprising a securing slot (33) through which an end of the clamping strip is to be passed in a backwards bended fashion where the strip (2) is folded a plurality of times, and at least one pair of bendable ears (36) to be bent inwards across the backwards bent section of the clamping strip at both its side edges after the clamping strip (2) has been passed through the securing slot (33) and has been bent backwards at the outer side of the mechanism part (3,5).

2. The tightening mechanism according to claim 1, wherein the two ears (9,10) at their bottom parts have a mutual distance from each other of 105% larger than the width of the strip shaped part (22).

3. The tightening mechanism according to claim 2, wherein one crossing connecting part is separated from the second connecting part (11) by 100% of the strip-shaped parts (22) width.

4. The tightening mechanism according to claim 3, characterized in that the locking device (35) for the strip (2) comprises at least a coupled of additional bendable ears (38) to be bent inwards across additionally folded sections of the clamping strip (2) at both its side edges after the backwards folded section of the clamping strip (2) has been secured by the first couple of bendable ears (36).

5. The tightening mechanism according to claim 4, characterized in that the meshing end (6) of the cup-bearing strip section (5) comprises a partially tube-shaped end section wherein the walls of the tube pass partially across the width of the strip (2) to provide an enforced end section (20) of the meshing end (6) of the cup-bearing strip section (5).

6. The tightening mechanism according to claim 3, characterized in that the meshing end (6) of the cup-bearing strip section (5) comprises a partially tube-shaped end section wherein the walls of the tube pass partially across the width of the strip (2) to provide an enforced end section (20) of the meshing end (6) of the cup-bearing strip section (5).

7. The tightening mechanism according to claim 1, characterized in that the meshing end (6) of the cup-bearing strip section (5) comprises a partially tube-shaped end section wherein the walls of the tube pass partially across the width of the strip (2) to provide an enforced end section (20) of the meshing end (6) of the cup-bearing strip section (5).

* * * * *

UNITED STATES PATENT AND TRADEMARK OFFICE
CERTIFICATE OF CORRECTION

PATENT NO. : 5,323,515
DATED : June 28, 1994
INVENTOR(S) : Samuel Baekdahl It is certified that error appears in the above-identified patent and that said Letters Patent is hereby corrected as shown below:

At column 1, line 26, after the word "part", insert --.--.

At column 4, line 15, delete "en" and insert therefor --end--.

At column 5, line 20, delete "strip-s" and insert therefor --strips--.

In claim 1, at column 5, line 52, delete "with" and insert therefor --when--.

In claim 1, at column 6, line 10, delete "wherein" and insert therefor --whereof--.

Signed and Sealed this

Eighth Day of November, 1994

*Attest:*

BRUCE LEHMAN

*Attesting Officer*    *Commissioner of Patents and Trademarks*